US009251988B1

(12) United States Patent
Du et al.

(10) Patent No.: US 9,251,988 B1
(45) Date of Patent: Feb. 2, 2016

(54) FIELD EMISSION CATHODE AND FIELD EMISSION DEVICE

(71) Applicants: Tsinghua University, Beijing (CN); HON HAI PRECISION INDUSTRY CO., LTD., New Tapei (TW)

(72) Inventors: Bing-Chu Du, Beijing (CN); Peng Liu, Beijing (CN); Duan-Liang Zhou, Beijing (CN); Chun-Hai Zhang, Beijing (CN); Shou-Shan Fan, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/753,387

(22) Filed: Jun. 29, 2015

(30) Foreign Application Priority Data

Jul. 10, 2014 (CN) .......................... 2014 1 0327650

(51) Int. Cl.
*H01J 9/02* (2006.01)
*H01J 1/304* (2006.01)
*H01J 19/24* (2006.01)
*B82Y 99/00* (2011.01)

(52) U.S. Cl.
CPC ................ *H01J 1/304* (2013.01); *H01J 19/24* (2013.01); *B82Y 99/00* (2013.01); *Y10S 977/742* (2013.01); *Y10S 977/939* (2013.01)

(58) Field of Classification Search
CPC .................. H01L 2924/00; B01L 7/52; B01L 2400/0406; B01L 2300/0654; B01L 2200/10
USPC ................................. 313/309, 310, 336, 351
See application file for complete search history.

(56) References Cited

U.S. PATENT DOCUMENTS

| | | | | |
|---|---|---|---|---|
| 5,729,244 | A * | 3/1998 | Lockwood ............. | H01J 3/021 313/309 |
| 5,997,713 | A * | 12/1999 | Beetz, Jr. ................ | B81B 1/004 205/124 |
| 6,045,677 | A * | 4/2000 | Beetz, Jr. ............... | C25D 11/02 205/122 |
| 8,912,526 | B2 * | 12/2014 | Nutzel ................... | B82Y 30/00 257/10 |
| 2007/0131849 | A1 * | 6/2007 | Beaulieu ............... | H01J 29/023 250/214 VT |

* cited by examiner

*Primary Examiner* — Vip Patel
(74) *Attorney, Agent, or Firm* — Novak Druce Connolly Bove + Quigg LLP

(57) ABSTRACT

The disclosure relates to a field emission cathode. The field emission cathode includes a microchannel plate, a cathode electrode and a number of cathode emitters. The microchannel plate is an insulative plate and includes a first surface and a second surface opposite to the first surface. The microchannel plate defines a number of holes extending through the microchannel plate from the first surface to the second surface. The cathode electrode is located on the first surface. The number of cathode emitters are filled in the number of holes and electrically connected with the cathode electrode.

20 Claims, 21 Drawing Sheets

Anode spots under different vacuum pressures
1. $2.5*10^{-5}$ pa
2. $1.5*10^{-4}$ pa
3. $5.0*10^{-4}$ pa
4. $1.2*10^{-2}$ pa
5. $4.5*10^{-2}$ pa

FIELD EMISSION CATHODE AND FIELD EMISSION DEVICE

CROSS-REFERENCE TO RELATED APPLICATIONS

This application claims all benefits accruing under 35 U.S.C. §119 from China Patent Application No. 201410327650.7, filed on Jul. 10, 2014, in the China Intellectual Property Office, disclosure of which is incorporated herein by reference.

FIELD

The subject matter herein generally relates to field emission cathodes and field emission devices, in particular, to field emission cathodes and field emission devices based on carbon nanotubes.

BACKGROUND

Field emission display (FED) is a new, rapidly developing flat panel display technology. Generally, FED can be roughly classified into diode and triode structures. In particular, carbon nanotube-based FED have attracted much attention in recent years.

Field emission cathode is important element in FED. A field emission cathode based on carbon nanotubes usually includes an insulating substrate, a cathode electrode attached on the substrate, a number of carbon nanotubes distributed on the cathode electrode. Usually, the carbon nanotubes are fabricated on the cathode electrode by printing carbon nanotube slurry or carbon nanotube ink. However, the carbon nanotubes fabricated by printing are not secured on the cathode electrode. Thus, the carbon nanotubes tend to be pulled out from the cathode electrode by a strong electric field force causing the field emission cathode to have a short life.

What is needed, therefore, is to provide a field emission cathode based on carbon nanotubes for solving the problem discussed above.

BRIEF DESCRIPTION OF THE DRAWINGS

Implementations of the present technology will now be described, by way of example only, with reference to the attached figures, wherein.

DETAILED DESCRIPTION

Figure 1:
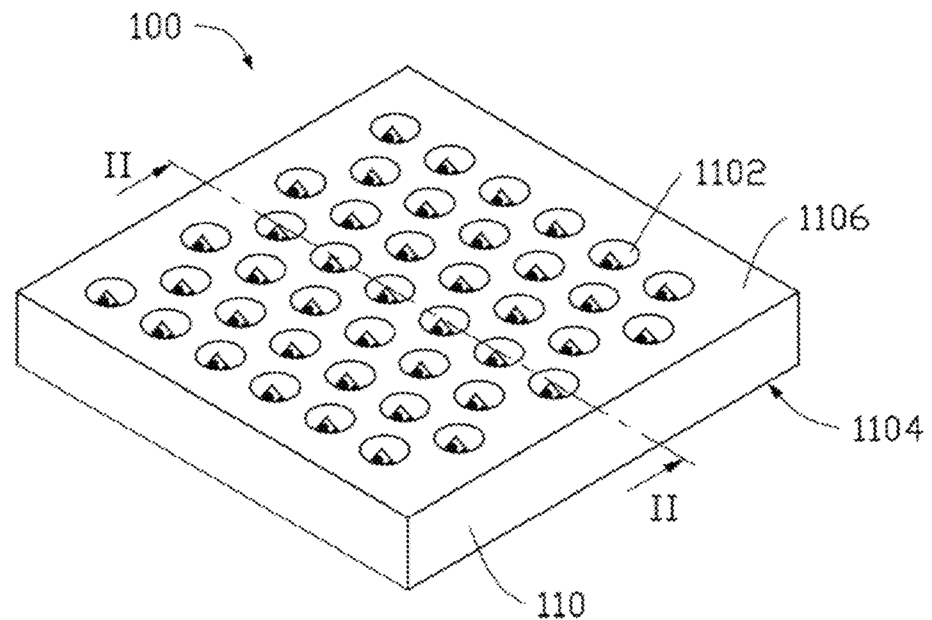
FIG. 1 is a schematic view of a field emission cathode of example 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

References will now be made to the drawings to describe, in detail, various embodiments of the present field emission cathodes and field emission devices.

Referring to FIGS. 1-11, a field emission cathode 100 of one embodiment includes a microchannel plate 110 and a plurality of cathode emitters 120. The microchannel plate 110 includes a first surface 1104 and a second surface 1106, opposite to the first surface 1104. The microchannel plate 110 defines a plurality of holes 1102. Each of the plurality of holes 1102 extends from the first surface 1104 to the second surface 1106 to get through the microchannel plate 110. The plurality of cathode emitters 120 are filled in the plurality of holes 1102 and electrically connected with the microchannel plate 110. The plurality of cathode emitters 120 are in direct contact with and fixed on inner walls of the plurality of holes 1102.

The microchannel plate 110 can be a conductor, a semiconductor or an insulator. The conductor can include material such as metal, alloy or other conductive materials. The semiconductor can include material such as silicon, gallium nitride or gallium arsenide. The insulator can include material such as silicon oxide, silicon nitride, silicon carbide, metal oxide, metal nitride, metal carbide, glass, ceramics or quartz. The microchannel plate 110 is a free-standing structure. The term "free-standing structure" means that the microchannel plate 110 can sustain the weight of itself when it is hoisted by a portion thereof without any significant damage to its structural integrity. The microchannel plate 110 is different from a layer or a film which is formed on a support by film technology such as spraying, spinning or sputtering, and cannot exist as a layer or film without the support. Especially, the microchannel plate 110 is different from the insulating layer fabricated by spinning coating and lithography. The shape, size and thickness of the microchannel plate 110 are not limited and can be selected according to need. For example, the microchannel plate 110 can be a square or rectangle plate and has a thickness above 100 micrometers.

Each of the plurality of holes 1102 can extend along a direction perpendicular with the first surface 1104. The extending direction of the hole 1102 and the first surface 1104 can form an angle α, where 30°<α 90°. In one embodiment, 45° α 60°. The diameter of the hole 1102 can be in a range from about 5 micrometers to about 200 micrometers. The distance between adjacent holes 1102 can be in a range from about 2 micrometers to about 200 micrometers. In one embodiment, the diameter of the hole 1102 is in a range from about 10 micrometers to about 40 micrometers, and the distance between adjacent holes 1102 is in a range from about 2 micrometers to about 10 micrometers. The microchannel plate 110 can be a double-layer structure or multi-layer structure. The holes 1102 of different layers are aligned as shown in FIG. 5.

Figure 3:
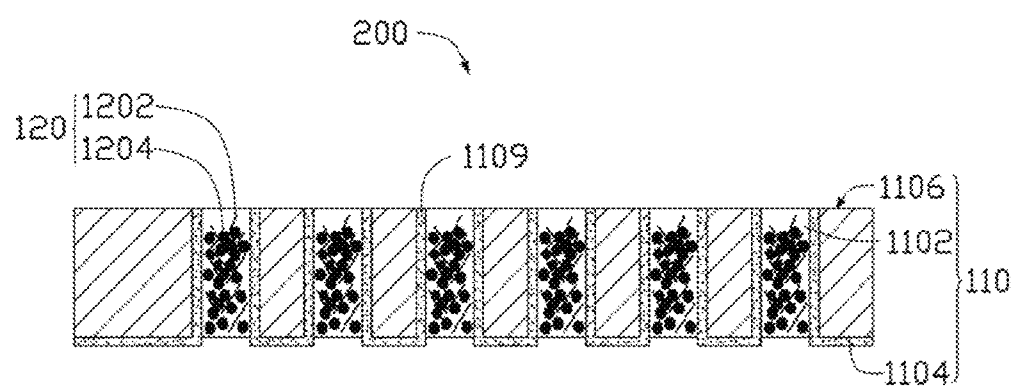
FIG. 3 is a cross-sectional view of a field emission cathode of example 2.

Furthermore, as shown in FIG. 3, if the microchannel plate 110 is made of insulative material, the inner walls of the plurality of holes 1102 can be coated with a conductive layer 1109 to improve the conductivity of the microchannel plate 110 or allow the plurality of cathode emitters 120 to electrically connect to the cathode electrode 130. The conductive layer 1109 can be a metal layer, alloy layer or indium tin oxide (ITO) layer.

Figure 5:
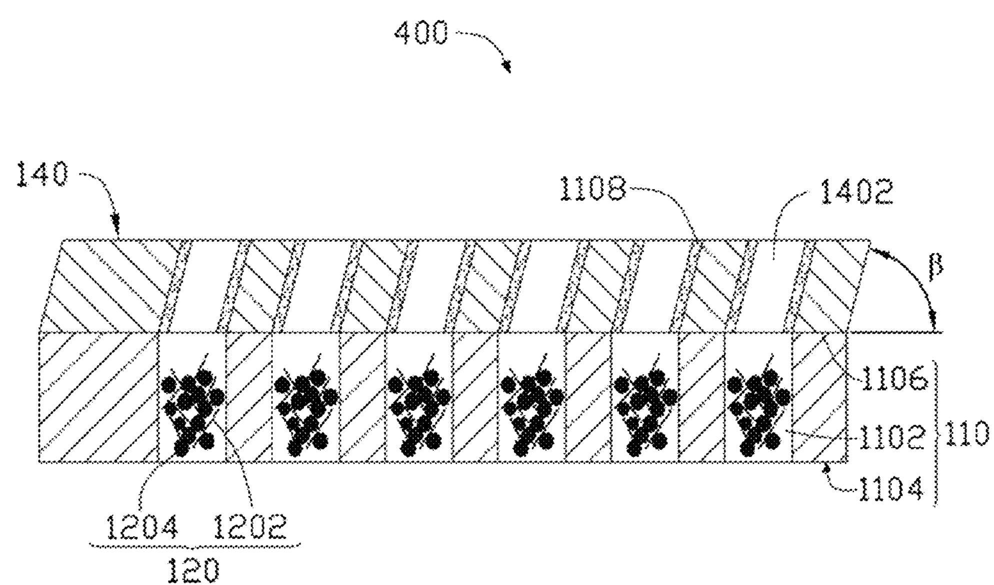
FIG. 5 is a cross-sectional view of a field emission cathode of example 4.

Furthermore, as shown in FIG. 5, the inner walls of the plurality of holes 1102 can be coated with a secondary electron layer 1108 so that to emit more field emission electrons. The secondary electron layer 1108 can includes material such as magnesium oxide, beryllium oxide, barium oxide, calcium oxide or cesium.

The plurality of cathode emitters 120 includes a plurality of carbon nanotubes 1202. The plurality of carbon nanotubes 1202 are combined with each other by van der Waals attractive force therebetween. The plurality of cathode emitters 120 are located in the plurality of holes 1102. At least some ends of the plurality of carbon nanotubes 1202 are exposed from the plurality of cathode emitters 120 and stands up to be used as electrons emission portions. The electrons emission portions are suspended and located in the plurality of holes 1102, but the electrons emitted from the electrons emission portions can move out of the microchannel plate 110 from the second surface 1106.

The plurality of cathode emitters 120 can also includes a plurality of conductive particles 1204. The plurality of conductive particles 1204 can be metal particles or ITO particles. The metal particles can be metal particles with low melting point such as tin particles, lead particles, zinc particles or magnesium particles. The metal particles can be metal particles with high melting point and high chemical stability such as gold particles, silver particles, copper particles, or iron particles.

The plurality of cathode emitters 120 can also includes an inorganic bonding material (not shown). The bonding material can be made of a low-temperature glass powder by melting and cooling.

Different examples of the field emission cathodes are provided below.

EXAMPLE 1

Figure 2:
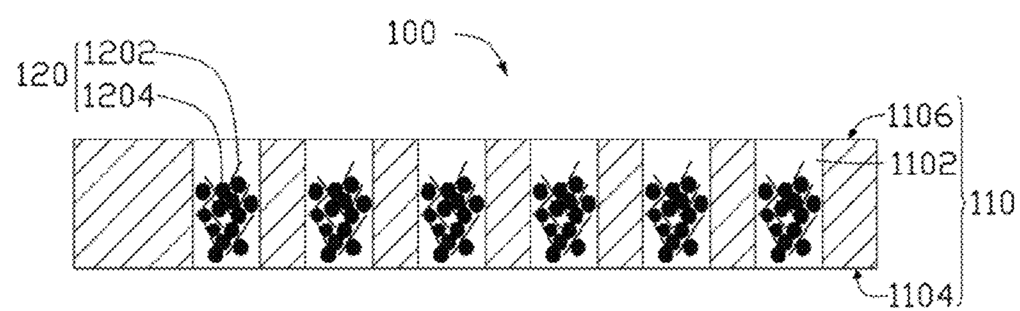
FIG. 2 is a cross-sectional view along line II-II of FIG. 1.

Referring to FIGS. 1-2, in the field emission cathode 100 of example 1, the microchannel plate 110 is a copper plate with a length of about 5 millimeters, a width of about 1.2 millimeters and a thickness of about 1 millimeter. The first surface 1104 and the second surface 1106 are substantially parallel with each other. The extending direction of the plurality of holes 1102 is perpendicular with the first surface 1104. The diameters of the plurality of holes 1102 are about 20 micrometers, and the distance between adjacent holes 1102 is about 5 micrometers. The plurality of cathode emitters 120 are located in the plurality of holes 1102 and fixed on the inner wall of the plurality of holes 1102. The plurality of cathode emitters 120 includes a plurality of carbon nanotubes 1202 and a plurality of conductive particles 1204. The plurality of carbon nanotubes 1202 do not extend out of the plurality of holes 1102. The field emission cathode 100 is free of special cathode electrode because the microchannel plate 110 is conductive and can be used as the cathode electrode. The electrons emitted from the carbon nanotubes 1202 will move for a period in the plurality of holes 1102 before getting out of the microchannel plate 110 from the second surface 1106. Part of the electrons emitted from the carbon nanotubes 1202 will collide and bombard the inner wall of the plurality of holes 1102 to generate secondary electrons. Thus, the electrons emission efficiency of the field emission cathode 100 is improved.

EXAMPLE 2

Referring to FIG. 3, the field emission cathode 200 of example 2 is similar with the field emission cathode 100 of example 1 except that the microchannel plate 110 is an insulative glass plate, and the inner walls of the plurality of holes 1102 and the first surface 1104 are coated with an aluminum conductive layer 1109. The aluminum conductive layer 1109 can be continuous and used as cathode electrode.

EXAMPLE 3

Figure 4:
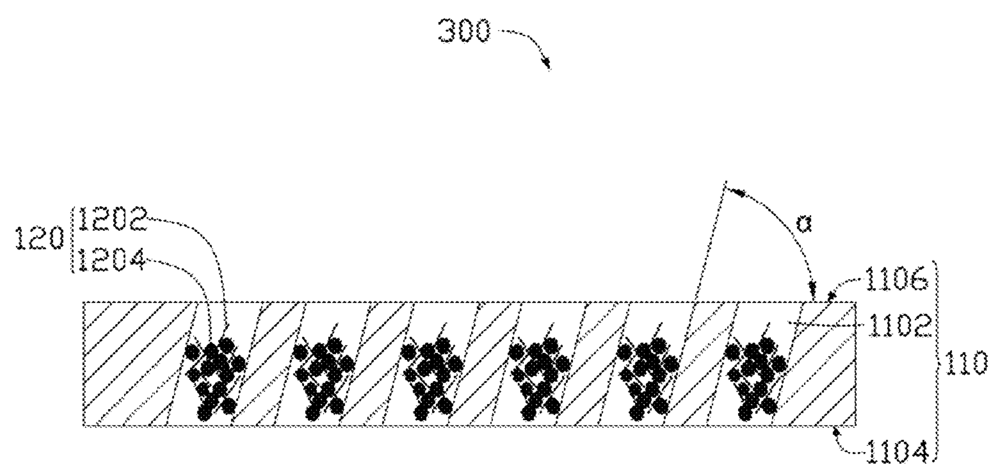
FIG. 4 is a cross-sectional view of a field emission cathode of example 3.

Referring to FIG. 4, the field emission cathode 300 of example 3 is similar with the field emission cathode 100 of example 1 except that the extending direction of the plurality of holes 1102 and the first surface 1104 form an angle α, where α=45°. Because the extending direction of the plurality of holes 1102 and the first surface 1104 form an angle $\alpha$, the electrons emitted from the carbon nanotubes 1202 will have more chance to collide and bombard the inner wall of the plurality of holes 1102 to generate more secondary electrons. Thus, the electrons emission efficiency of the field emission cathode 100 is improved.

EXAMPLE 4

Referring to FIG. 5, the field emission cathode 400 of example 4 is similar with the field emission cathode 100 of example 1 except that a second microchannel plate 140 is located on the second surface 1106 of the microchannel plate 110. The second microchannel plate 140 defines a plurality of second holes 1402. The plurality of second holes 1402 are through holes and aligned with the plurality of holes 1102 one by one. The extending direction of the plurality of second holes 1402 and the second surface 1106 form an angle $\beta$, where $30^\circ<\beta\ 90^\circ$. In one embodiment, $45^\circ\ \beta\ 60^\circ$. Furthermore, the inner walls of the plurality of second holes 1402 are coated with a magnesium oxide secondary electron layer 1108 so that to emit more field emission electrons. This structure allow the electrons emitted from the carbon nanotubes 1202 have more chance to collide and bombard the inner wall of the plurality of second holes 1402 to generate more secondary electrons. Thus, the electrons emission efficiency of the field emission cathode 100 is improved.

EXAMPLE 5

Figure 6:
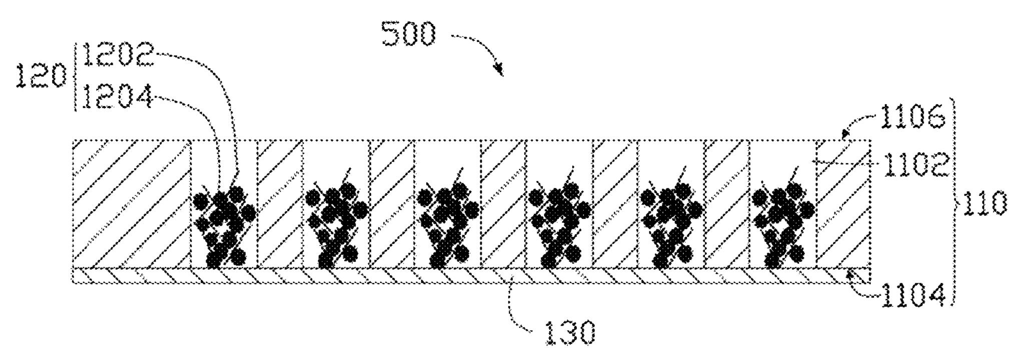
FIG. 6 is a cross-sectional view of a field emission cathode of example 5.

Referring to FIG. 6, the field emission cathode 500 of example 5 is similar with the field emission cathode 100 of example 1 except that the microchannel plate 110 is a glass plate, and further a cathode electrodes 130 is located on the first surface 1104 of the microchannel plate 110 and electrically connected to the plurality of cathode emitters 120. The plurality of cathode emitters 120 are uniformly dispersed in the plurality of holes 1102 and fixed on the inner walls of the plurality of holes 1102 by solidifying carbon nanotube slurry.

EXAMPLE 6

Figure 7:
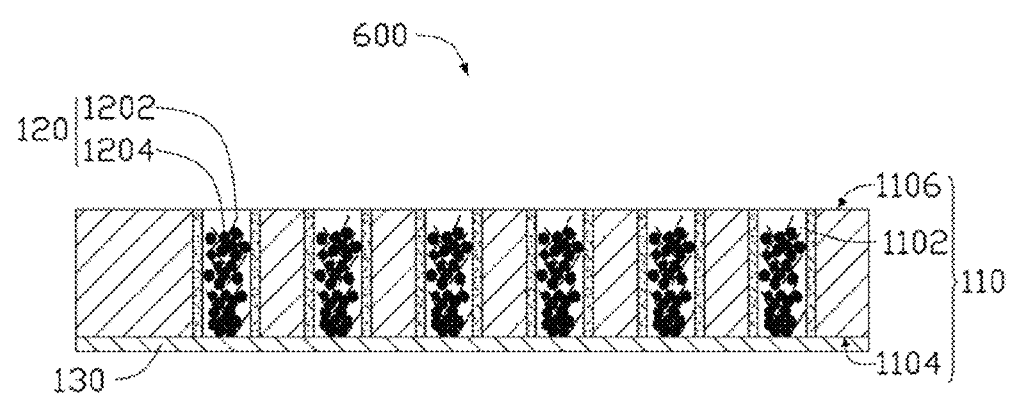
FIG. 7 is a cross-sectional view of a field emission cathode of example 6.

Referring to FIG. 7, the field emission cathode 600 of example 6 is similar with the field emission cathode 500 of example 5 except that a magnesium oxide secondary electron layer 1108 is coated on the inner walls of the plurality of holes 1102.

EXAMPLE 7

Figure 8:
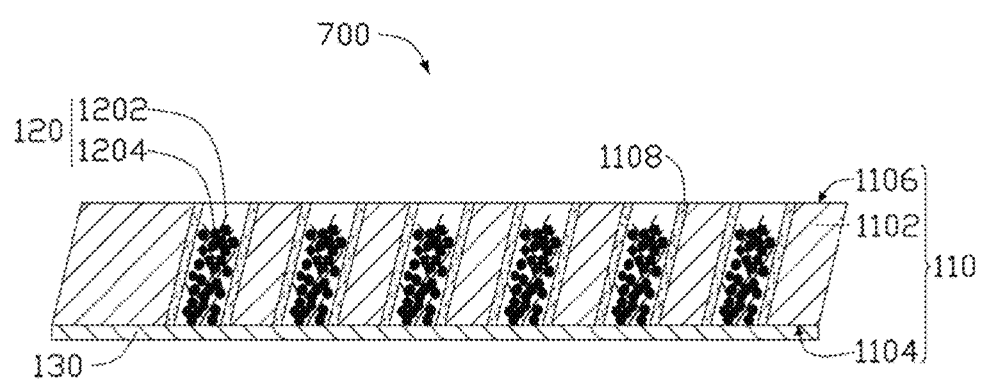
FIG. 8 is a cross-sectional view of a field emission cathode of example 7.

Referring to FIG. 8, the field emission cathode 700 of example 7 is similar with the field emission cathode 600 of example 6 except that the extending direction of the plurality of holes 1102 and the first surface 1104 form an angle $\alpha$, where $\alpha=60^\circ$.

EXAMPLE 8

Figure 9:
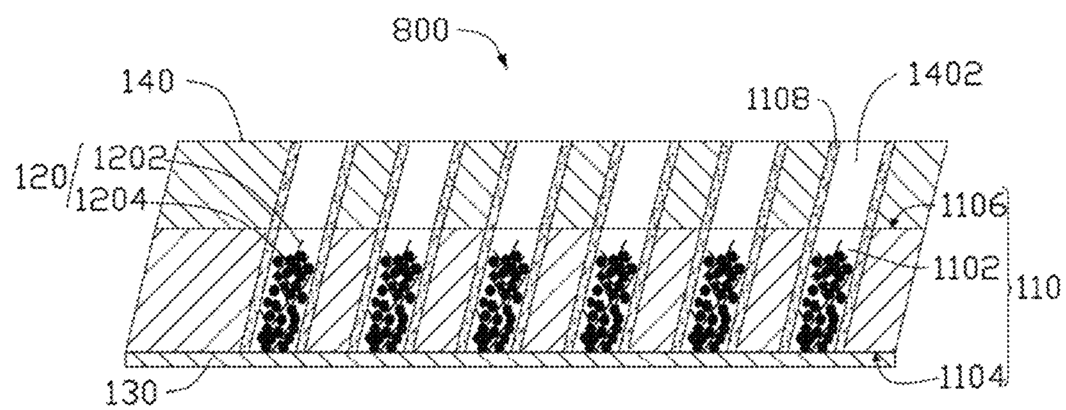
FIG. 9 is a cross-sectional view of a field emission cathode of example 8.

Referring to FIG. 9, the field emission cathode 800 of example 8 is similar with the field emission cathode 700 of example 7 except that a second microchannel plate 140 is located on the second surface 1106 of the microchannel plate 110. The second microchannel plate 140 defines a plurality of second holes 1402. The plurality of second holes 1402 are through holes and aligned with the plurality of holes 1102 one by one. The extending direction of the plurality of second holes 1402 is the same as the extending direction of the plurality of holes 1102. The magnesium oxide secondary electron layer 1108 is coated both on the inner walls of the plurality of holes 1102 and the plurality of second holes 1402.

EXAMPLE 9

Figure 10:
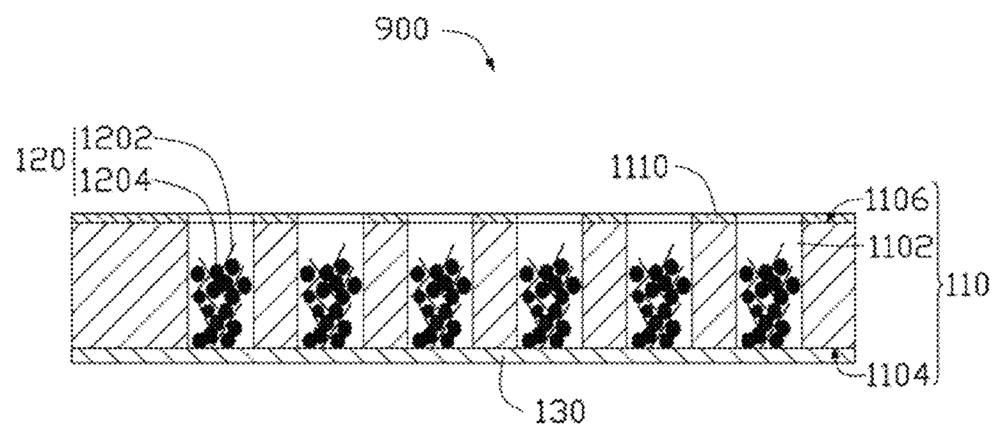
FIG. 10 is a cross-sectional view of a field emission cathode of example 9.

Referring to FIG. 10, the field emission cathode 900 of example 9 is similar with the field emission cathode 500 of example 5 except that a gate electrode 1110 is located on the second surface 1106 of the microchannel plate 110. The gate electrode 1110 can be a free standing metal mesh or a deposited metal film. Parts of the gate electrode 1110 can extend to be suspended above the plurality of holes 1102 and define a plurality of through holes to allow the electrons to get through. The gate electrode 1110 can allow the field emission cathode 900 have a lower electron emission voltage. In example 9, the gate electrode 1110 is a copper mesh.

EXAMPLE 10

Figure 11:
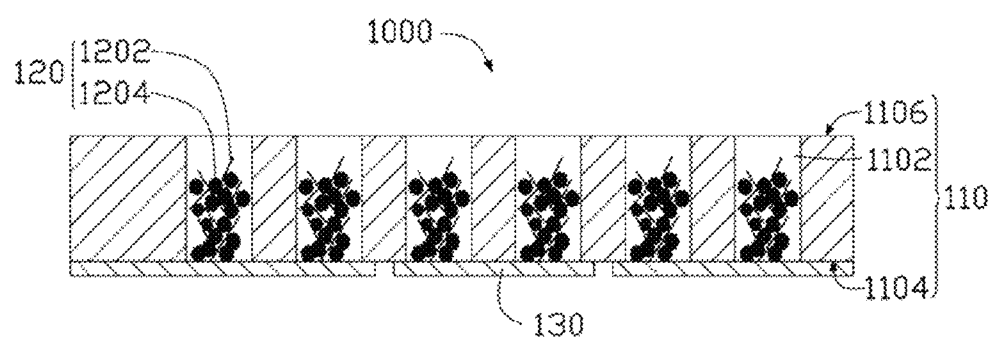
FIG. 11 is a cross-sectional view of a field emission cathode of example 10.

Referring to FIG. 11, the field emission cathode 1000 of example 10 is similar with the field emission cathode 500 of example 5 except that the cathode electrode 130 is a patterned copper film, such as a plurality of copper strips parallel with and spaced from each other.

Figure 12:
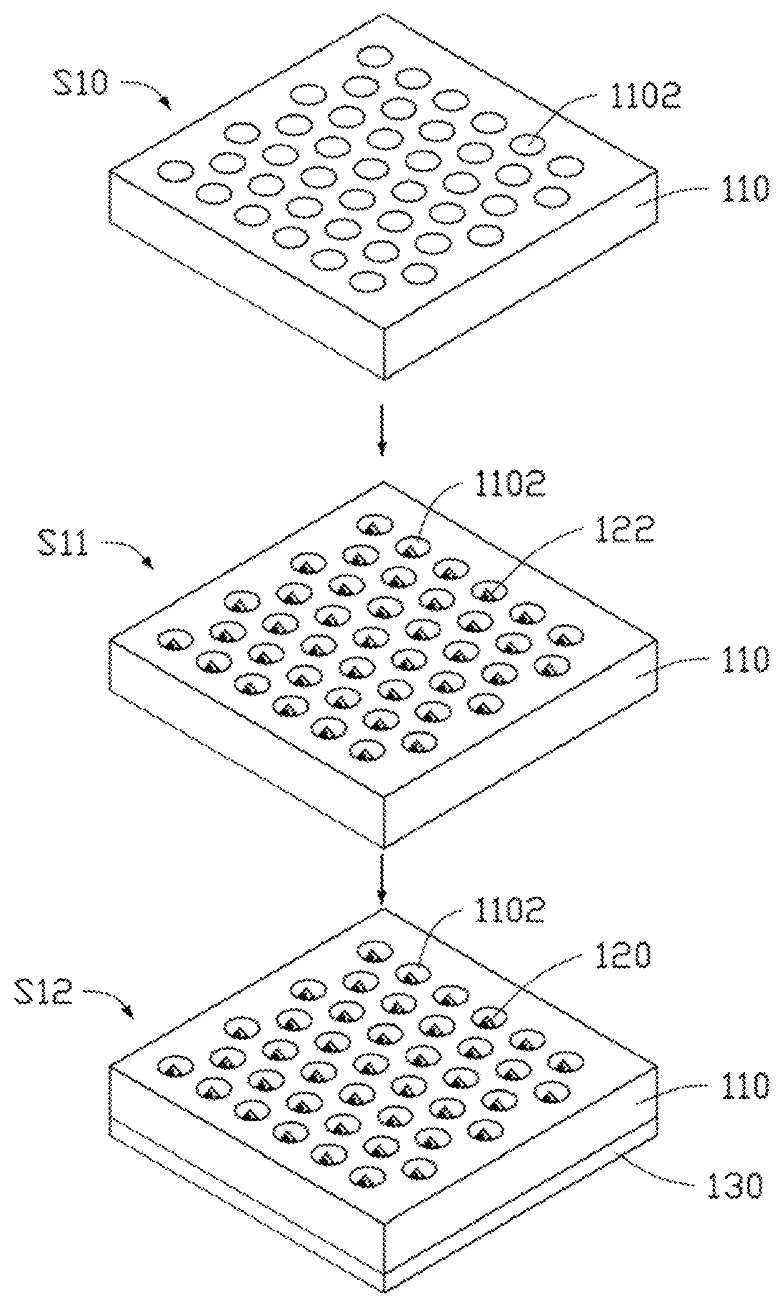
FIG. 12 is a flowchart of one embodiment of a method for making a field emission cathode.

Furthermore, a method for making the field emission cathodes above is provided below. Referring to FIG. 12, the method includes following steps:

step (S10), providing a microchannel plate 110, wherein the microchannel plate 110 includes a first surface 1104 and a second surface 1106, opposite to the first surface 1104, and defines a plurality of holes 1102 extending through the microchannel plate 110 from the first surface 1104 to the second surface 1106; and step (S11), filling the plurality of holes 1102 with carbon nanotube slurry 122 and solidifying the carbon nanotube slurry 122.

In step (S10), the microchannel plate 110 can be any microchannel plate 110 described above. In one embodiment, the microchannel plate 110 is a glass plate with a length of about 5 millimeters, a width of about 1.2 millimeters and a thickness of about 1 millimeter. The diameters of the plurality of holes 1102 are about 20 micrometers, and the distance between adjacent holes 1102 is about 5 micrometers.

Furthermore, the step (S10) includes depositing a secondary electron layer 1108 or a conductive layer 1109 on the inner walls of the plurality of holes 1102.

In step (S11), the carbon nanotube slurry 122 includes at least carbon nanotubes and organic carrier. After filling the plurality of holes 1102 with carbon nanotube slurry 122, the carbon nanotube slurry 122 are adhered on the inner walls of the plurality of holes 1102.

The carbon nanotubes can be single-walled carbon nanotubes, double-walled carbon nanotubes, multi-walled carbon nanotubes, and combinations thereof. The diameter of each single-walled carbon nanotube can range from about 0.5 nanometers to about 50 nanometers. The diameter of each double-walled carbon nanotube can range from about 1 nanometer to about 50 nanometers. The diameter of each multi-walled carbon nanotube can range from about 1.5 nanometers to about 50 nanometers. The length of the carbon nanotubes can be larger than 1 micrometer. In one embodiment, the length of the carbon nanotubes is in a range from about 5 micrometers to about 15 micrometers.

The organic carrier is a volatilizable organic material and can be removed by heating. The organic carrier can is a mixture of ethyl cellulose, terpineol, and ethanol. The weight ratio of the ethyl cellulose can be in a range from about 10% to about 40%, the weight ratio of the terpineol can be in a range from about 30% to about 50%, and the weight ratio of the ethanol can be in a range from about 30% to about 50%. The ethyl cellulose is a stabilizer and has strong polarity and can combine with the plasticizer to form a network structure or chain structure to enhance the viscosity and plasticity of the carbon nanotube slurry 122. The terpineol is a diluent and can dissolve the stabilizer and allows the carbon nanotube slurry 122 to have liquidity. The ethanol is a solvent and used to disperse the carbon nanotubes.

The weight ratio of the carbon nanotubes can be in a range from about 2% to about 5%, and the weight ratio of the organic carrier can be in a range from about 95% to about 98%. In one embodiment, the weight ratio of the carbon nanotubes can be in a range from about 2.5% to about 3%, and the weight ratio of the organic carrier can be in a range from about 97% to about 98% so that the carbon nanotube slurry 122 has good liquidity and can be filled in the plurality of holes 1102 easily. Also, the carbon nanotube slurry 122 has good plasticity and can be uniformly dispersed in the plurality of holes 1102. The viscosity of the carbon nanotube slurry 122 can be in a range from about 10 Pa·s to about 12 Pa·s at a shear rate of about 10 second-1. In one embodiment, the viscosity of the carbon nanotube slurry 122 is in a range from about 10 Pa·s to about 11 Pa·s at a shear rate of about 10 second-1 so that the carbon nanotube slurry 122 can be filled in and adhered to the inner walls of the plurality of holes 1102 easily.

Furthermore, the carbon nanotube slurry 122 can include conductive particles, such as metal powder. The average diameter of the conductive particles can be less than or equal to 1 micrometer, and the specific surface area of the conductive particles can be in a rang from about 1 m2/g to about 3 m2/g.

Furthermore, the carbon nanotube slurry 122 can include glass powder. The glass powder can be a low melting point glass powder with a melting point in a range from about 300° C. to about 600° C. The effective diameter of the glass powder can be less than or equal to 1 micrometer.

If the carbon nanotube slurry 122 further includes both the conductive particles and the glass powder, the weight ratio of the carbon nanotubes can be in a range from about 2% to about 5%, the weight ratio of the conductive particles can be in a range from about 2% to about 4%, the weight ratio of the glass powder can be in a range from about 1% to about 3%, and the weight ratio of the organic carrier can be in a range from about 88% to about 95%.

Figure 13:
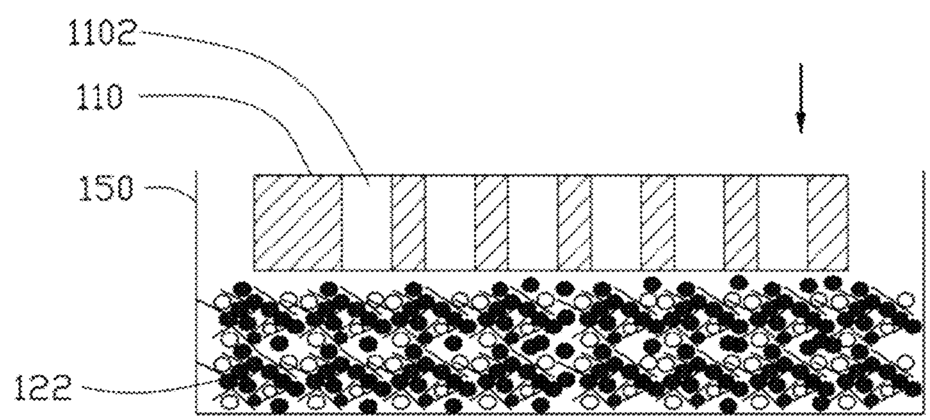
FIG. 13 is a schematic view of one embodiment of an immersing method for filling a microchannel plate with a carbon nanotube slurry.

Referring to FIG. 13, the plurality of holes 1102 can be filled with the carbon nanotube slurry 122 by immersing. In one embodiment, the filling the plurality of holes 1102 with carbon nanotube slurry 122 includes following substeps:

placing the microchannel plate 110 above the carbon nanotube slurry 122 in a container 150; and immersing the microchannel plate 110 in the carbon nanotube slurry 122 by pressing so that some of the carbon nanotube slurry 122 to fill in the plurality of holes 1102.

Figure 14:
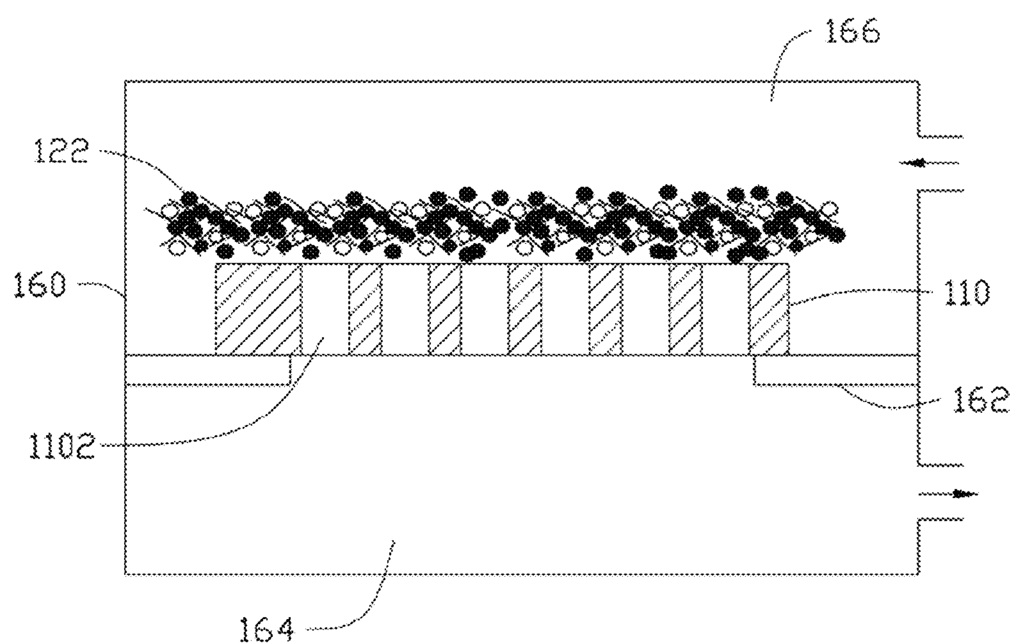
FIG. 14 is a schematic view of one embodiment of a pressing method for filling a microchannel plate with a carbon nanotube slurry.

Referring to FIG. 14, the plurality of holes 1102 can also be filled with the carbon nanotube slurry 122 by pressing. In one embodiment, the filling the plurality of holes 1102 with carbon nanotube slurry 122 includes following substeps:

coating the carbon nanotube slurry 122 on a surface of the microchannel plate 110;

placing the microchannel plate 110 with the carbon nanotube slurry 122 in a chamber 160 to divide the chamber 160 in to a first room 164 under the microchannel plate 110 and a second room 166 above the microchannel plate 110; and filling the carbon nanotube slurry 122 in the plurality of holes 1102 by exhausting gas from the first room 164 or filling gas in the second room 166.

The chamber 160 includes a support 162 therein, and the microchannel plate 110 is located on the support 162. The support 162 defines a through hole so that the plurality of holes 1102 to be suspended.

In step (S11), the carbon nanotube slurry 122 can be solidified by heating the microchannel plate 110 to a temperature in a range from about 150° C. to about 500° C. In one embodiment, the microchannel plate 110 is heated to a temperature in a range from about 150° C. to about 300° C.

Before heating, the carbon nanotubes 1202 of the carbon nanotube slurry 122 are connected to form a net and uniformly dispersed in the organic carrier. The ends of some carbon nanotubes 1202 are free ends. The carbon nanotube slurry 122 are adhered to the inner surface of the plurality of holes 1102 by surface tension, and the carbon nanotubes 1202 are combined with each other by the organic carrier. The organic carrier will be volatilized during heating. Thus, the surface tension between the carbon nanotube slurry 122 and the inner surface of the plurality of holes 1102 will be replaced by the van der Waals attractive force between the carbon nanotubes 1202 and the inner surface of the plurality of holes 1102. After heating, the carbon nanotubes 1202 will be joined together and fixed on the inner surface of the plurality of holes 1102 only by the van der Waals attractive force therebetween. The free ends of the carbon nanotubes 1202 will stand up and be used as electrons emission portions.

In one embodiment, the carbon nanotube slurry 122 includes low melting point glass powder or low melting point metal powder. The low melting point glass powder or low melting point metal powder will be melted during the heating and solidified during cooling to bonder the carbon nanotubes 1202 together and fix the carbon nanotubes 1202 on the inner surface of the plurality of holes 1102 firmly.

Furthermore, a process of centrifugal movement or oscillation can be performed on the microchannel plate 110 during or after heating so that the carbon nanotube slurry 122 to be adhere on the inner surface of the plurality of holes 1102 closely.

Figure 15:
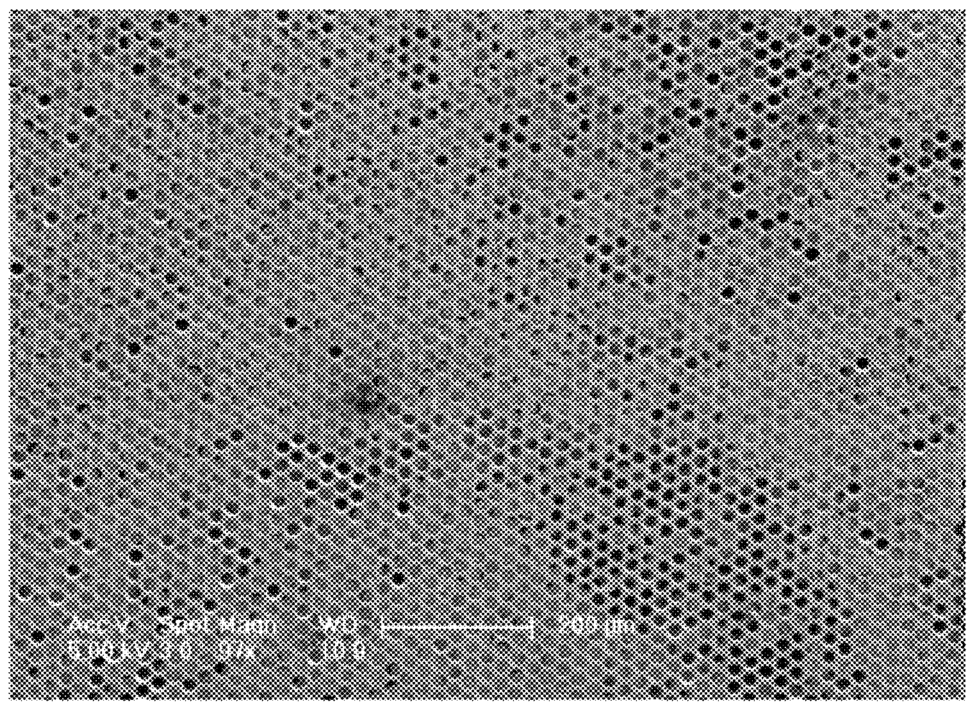
FIG. 15 is a photo image of one embodiment of a microchannel plate filled with carbon nanotube slurry and treated by heating.
Figure 16:
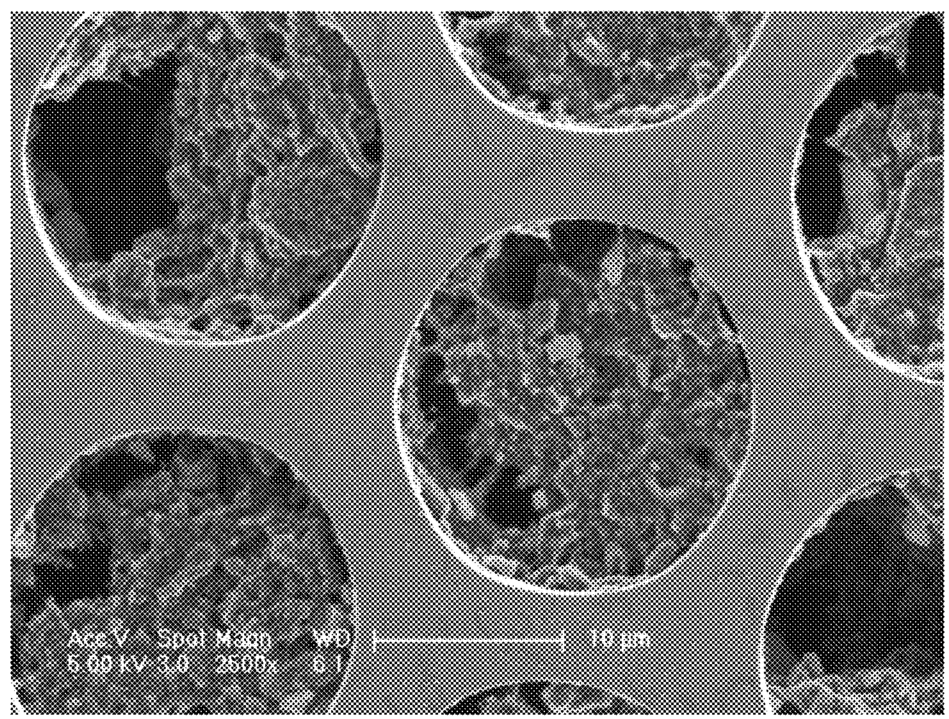
FIG. 16 is a partially enlarged photo image of the FIG. 15.

As shown in FIGS. 15-16, after heating, the carbon nanotube slurry 122 is uniformed filled in the plurality of holes 1102 of microchannel plate 110.

Furthermore, if the microchannel plate 110 is an insulative plate, a step (S12) of applying a cathode electrode 130 on the first surface 1104 can be performed. The cathode electrode 130 is electrically connected with the carbon nanotubes 1202. The cathode electrode 130 can be a conductive film formed by electroplating or electroless plating. Thus, the cathode electrode 130 will be filled in the plurality of holes 1102. The cathode electrode 130 can also be a free standing plate such as metal sheet or ITO glass. In one embodiment, the cathode electrode 130 is a copper sheet.

Furthermore, if the microchannel plate 110 is an insulative plate, a step of applying a gate electrode 1110 on the second surface 1106 can be performed. The gate electrode 1110 can be a conductive film formed by electroplating or electroless plating.

Furthermore, a step of applying a second microchannel plate 140 on the second surface 1106 can be performed.

Figure 17:
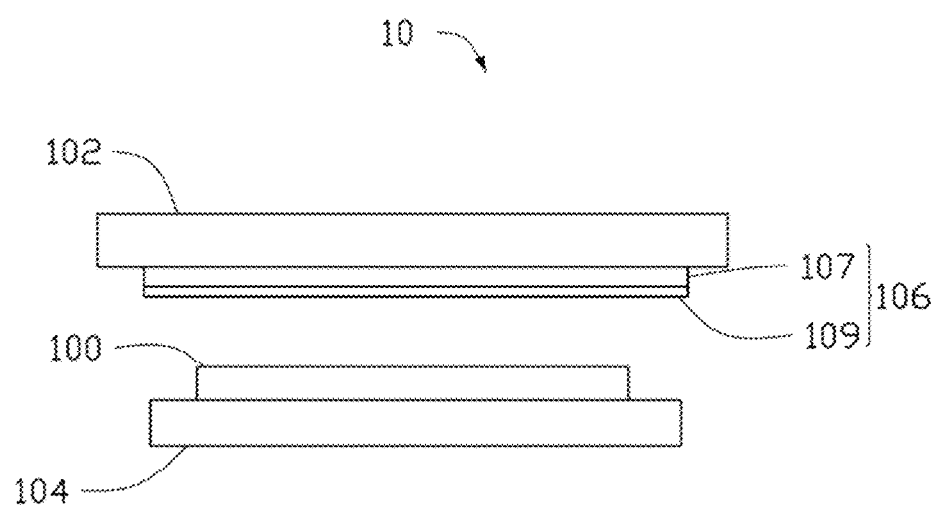
FIG. 17 is a schematic view of one embodiment of a field emission device.

Referring to FIG. 17, in one embodiment, a field emission device 10 using the field emission cathodes above is provided. The field emission device 10 includes an anode substrate 102, a cathode substrate 104 spaced from the anode substrate 102, an anode structure 106 located on the anode substrate 102 and the field emission cathode 100 located on the cathode substrate 104 and spaced from the anode structure 106.

The cathode substrate 104 can be a glass plate, ceramic plate, or a silicon plate. The anode substrate 102 can be a transparent plate such as a glass plate. In one embodiment, both the cathode substrate 104 and the anode substrate 102 is glass plate.

The anode structure 106 includes an anode electrode 107 located on the anode substrate 102. The anode electrode 107 can be a transparent film such as an ITO film. Furthermore, the anode structure 106 can include a fluorescent layer 109 located on the anode electrode 107 so that the field emission device 10 can be used as a field emission display.

The field emission properties of the field emission device 10 is tested in a vacuum with a pressure of about 10-5 Pa. The distance between the field emission cathode 100 and the anode structure 106 is about 3 millimeters. Although the sparking occurs in some location many times, the whole field emission is not destroyed.

Figure 18:
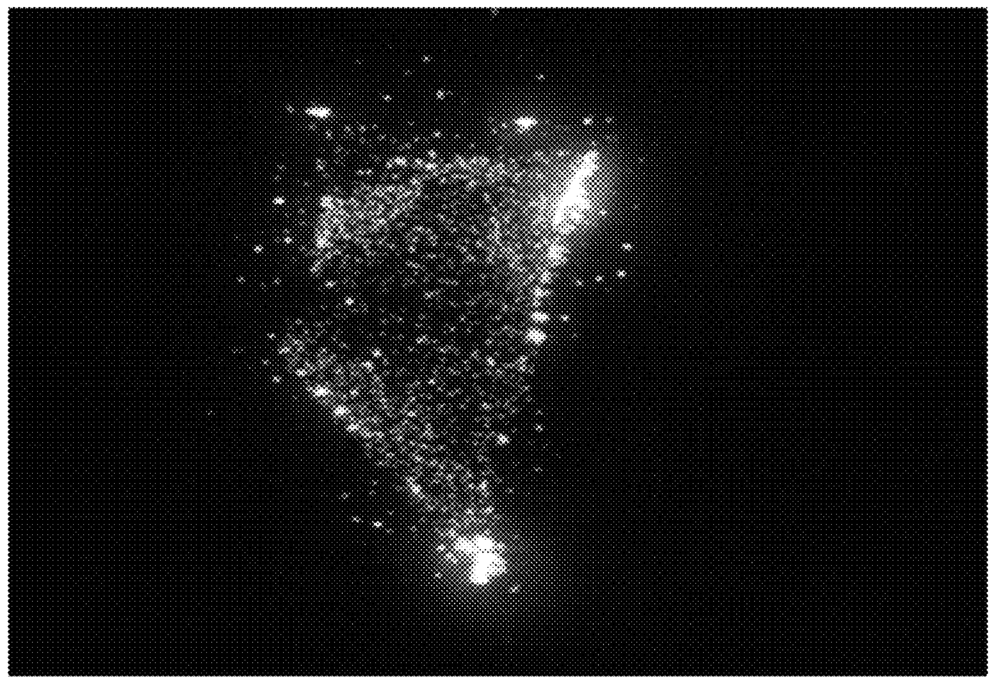
FIG. 18 is a photo image of one embodiment of anode spots of a field emission device.

As shown in FIG. 18, it can be seen that from the image of the screen and brightness, the field emission device 10 has a stable field emission property. Thus, the microchannel plate 110 has protected the cathode emitters 120 from being destroyed during sparking occurring in some location. If the ends of the carbon nanotubes extend out of in the plurality of holes 1102 and not protected by the microchannel plate 110, the whole field emission property of the field emission device 10 will be destroyed even if sparking occurs in some location.

Figure 19:
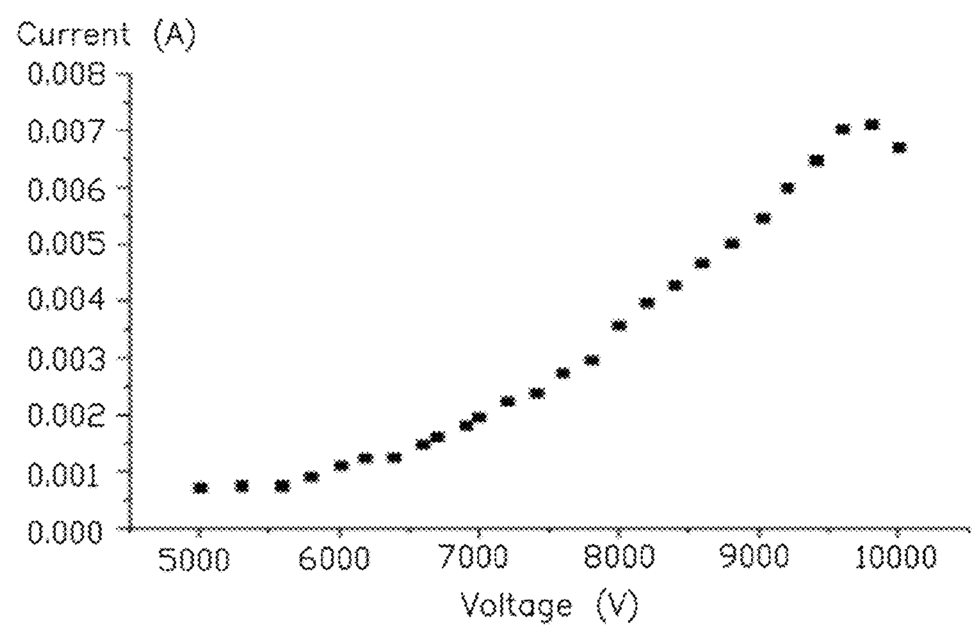
FIG. 19 is an I-V relationship of one embodiment of a field emission device.
Figure 20:
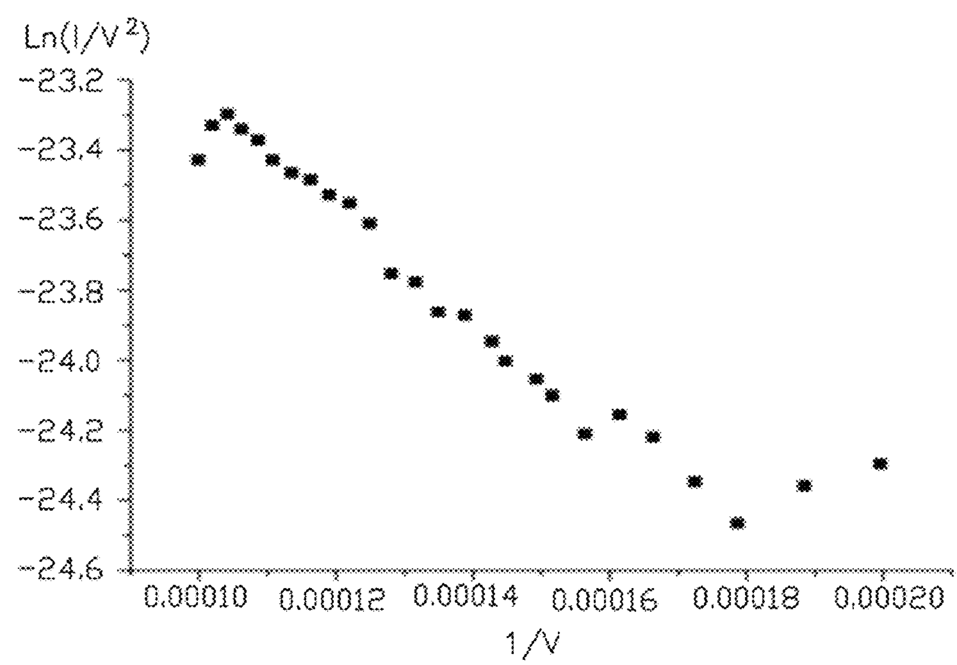
FIG. 20 is a FN curve of one embodiment of a field emission device.
Figure 21:
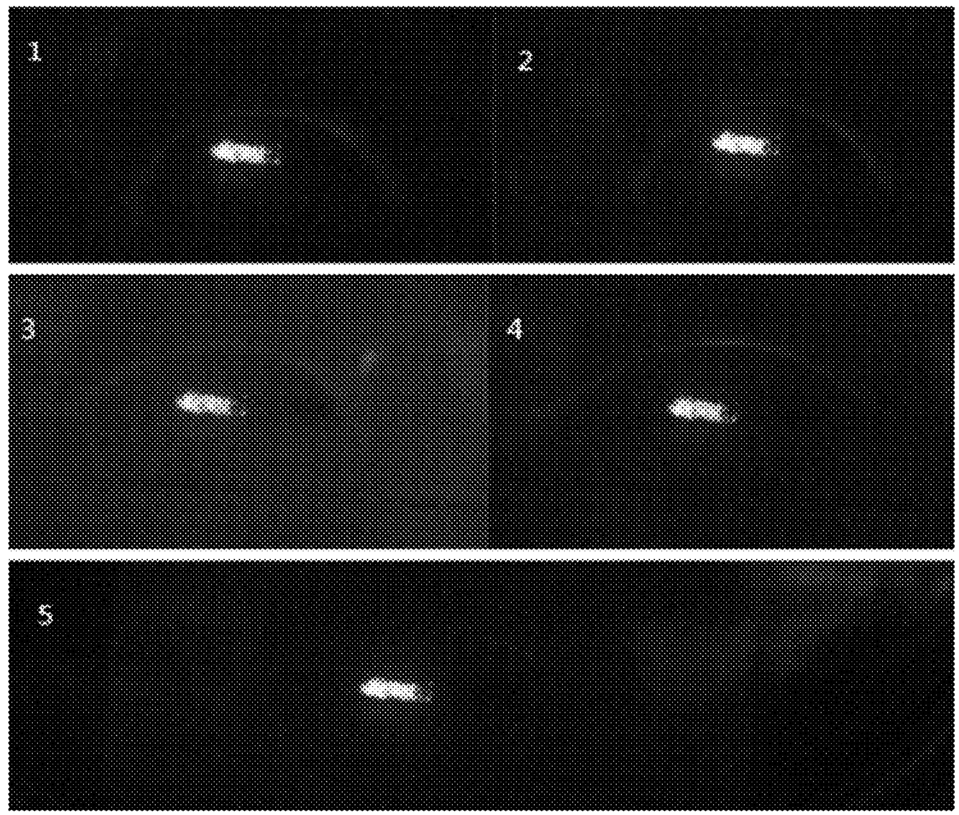
FIG. 21 is photo images of anode spots under different vacuum pressures.

FIG. 19 is an I-V relationship of one embodiment of the field emission device 10. As shown in FIG. 19, the highest voltage pulse is about ten thousands volts, the frequency is about 50 Hz, the width is about 10 micrometers, and the current is obtained in the interval of about 200 volts. FIG. 20 is a FN curve of one embodiment of the field emission device 10. As shown in FIG. 20, the field emission cathode has a field emission property in accordance with the field emission characteristic. FIG. 21 is photo images of anode spots of the field emission device 10 under different vacuum pressures. The he highest voltage pulse is about eight thousands volts, and the width is about 10 micrometers. As shown in FIG. 21, the field emission device 10 has substantially the same anode spots in both low and high vacuum pressures.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A field emission cathode, comprising:

a microchannel plate, wherein the microchannel plate is an insulative plate and comprises a first surface and a second surface, opposite to the first surface; and the microchannel plate defines a plurality of holes extending through the microchannel plate from the first surface to the second surface;

a cathode electrode located on the first surface; and a plurality of cathode emitters, wherein the plurality of cathode emitters are filled in the plurality of holes and electrically connected with the cathode electrode.

2. The field emission cathode of claim 1, wherein the microchannel plate comprise material selected from the group consisting of silicon oxide, silicon nitride, silicon carbide, metal oxide, metal nitride, metal carbide, glass, ceramics and quartz.

3. The field emission cathode of claim 1, wherein the plurality of holes have substantially the same extending direction, and the first surface is substantially parallel with the second surface.

4. The field emission cathode of claim 3, wherein the extending direction and the first surface form an angle $\alpha$, where $30^\circ < \alpha\ 90^\circ$.

5. The field emission cathode of claim 1, wherein a diameter of each of the plurality of holes is in a range from about 10 micrometers to about 40 micrometers, and a distance between adjacent holes is in a range from about 2 micrometers to about 10 micrometers.

6. The field emission cathode of claim 1, wherein inner walls of the plurality of holes are coated with secondary electron layer.

7. The field emission cathode of claim 1, wherein the plurality of cathode emitters comprises a plurality of carbon nanotubes combined with each other by van der Waals attractive force therebetween.

8. The field emission cathode of claim 7, wherein at least some ends of the plurality of carbon nanotubes are exposed from the plurality of cathode emitters and stands up.

9. The field emission cathode of claim 7, wherein the plurality of carbon nanotubes are fixed on inner walls of the plurality of holes only by the van der Waals attractive force.

10. The field emission cathode of claim 1, wherein the plurality of cathode emitters comprises a plurality of carbon nanotubes and a plurality of conductive particles.

11. The field emission cathode of claim 10, wherein the plurality of conductive particles are metal particles or indium tin oxide particles.

12. The field emission cathode of claim 1, wherein the plurality of cathode emitters comprises a plurality of carbon nanotubes and an inorganic bonding material, and the plurality of carbon nanotubes are bonded on inner walls of the plurality of holes by the inorganic bonding material.

13. The field emission cathode of claim 12, wherein the inorganic bonding material is made of a low-temperature glass powder by melting and cooling.

14. A field emission cathode, comprising:

a first microchannel plate, wherein the first microchannel plate is an insulative plate and comprises a first surface and a second surface, opposite to the first surface; and the first microchannel plate defines a plurality of first holes extending through the first microchannel plate the from the first surface to the second surface;

a second microchannel plate located on the first surface, wherein the second microchannel plate defines a plurality of second holes extending through the second microchannel plate and aligned with the plurality of first holes;

a cathode electrode located on the second surface; and a plurality of cathode emitters, wherein the plurality of cathode emitters are filled in the plurality of first holes and electrically connected with the cathode electrode.

15. The field emission cathode of claim 14, wherein the plurality of second holes have substantially the same extending direction, and the first surface is substantially parallel with the second surface.

16. The field emission cathode of claim 15, wherein the extending direction and the first surface form an angle $\beta$, where $30^\circ<\beta\ 90^\circ$.

17. The field emission cathode of claim 16, wherein the plurality of first holes extend along a direction substantially perpendicular with the first surface.

18. The field emission cathode of claim 14, wherein inner wall of the plurality of second holes are coated with secondary electron layer.

19. A field emission device, comprising: an anode substrate, a cathode substrate spaced from the anode substrate, an anode structure located on the anode substrate and a field emission cathode located on the cathode substrate and spaced from the anode structure; wherein the field emission cathode comprises:

a microchannel plate, wherein the microchannel plate is an insulative plate and comprises a first surface and a second surface, opposite to the first surface; and the microchannel plate defines a plurality of first holes extending through the microchannel plate the from the first surface to the second surface;

a cathode electrode located on the first surface; and a plurality of cathode emitters, wherein the plurality of cathode emitters are filled in the plurality of first holes and electrically connected with the cathode electrode.

20. The field emission device of claim 19, wherein the field emission cathode further comprises a second microchannel plate located on the first surface, the second microchannel plate defines a plurality of second holes extending through the second microchannel plate and aligned with the plurality of first holes.

* * * * *